(12) United States Patent
Chkodrov et al.

(10) Patent No.: US 7,774,359 B2
(45) Date of Patent: Aug. 10, 2010

(54) BUSINESS ALERTS ON PROCESS INSTANCES BASED ON DEFINED CONDITIONS

(75) Inventors: Gueorgui B. Chkodrov, Redmond, WA (US); Ahmed M. S. A. W. Moustafa, Seattle, WA (US); David S. Taniguchi, Kirkland, WA (US); John D. Ballard, Woodinville, WA (US); Richard Z. Jason, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/114,444

(22) Filed: Apr. 26, 2005

(65) Prior Publication Data

US 2006/0241959 A1 Oct. 26, 2006

(51) Int. Cl.
*G06F 7/00* (2006.01)
(52) U.S. Cl. .................. 707/774; 707/607; 707/994
(58) Field of Classification Search ................. None
See application file for complete search history.

(56) References Cited

U.S. PATENT DOCUMENTS

| | | | | |
|---|---|---|---|---|
| 5,721,903 | A * | 2/1998 | Anand et al. ............. | 707/603 |
| 5,794,053 | A * | 8/1998 | Doris et al. ............. | 717/162 |
| 5,891,046 | A | 4/1999 | Cyrus et al. | |
| 6,411,961 | B1 | 6/2002 | Chen ...................... | 707/102 |
| 6,617,969 | B2 * | 9/2003 | Tu et al. .................. | 340/517 |
| 6,662,188 | B1 | 12/2003 | Rasmussen et al. ........ | 707/102 |
| 6,697,810 | B2 * | 2/2004 | Kumar et al. ............. | 707/10 |
| 6,708,186 | B1 | 3/2004 | Claborn et al. ............ | 707/102 |
| 6,763,353 | B2 | 7/2004 | Li et al. | |
| 6,775,658 | B1 | 8/2004 | Zothner | |
| 6,895,438 | B1 | 5/2005 | Ulrich ..................... | 709/227 |
| 6,898,790 | B1 | 5/2005 | Cheong et al. ............ | 718/100 |
| 7,039,871 | B2 | 5/2006 | Cronk | |
| 7,233,952 | B1 | 6/2007 | Chen ....................... | 707/100 |
| 7,444,342 | B1 | 10/2008 | Hall et al. | |
| 2002/0016771 | A1 * | 2/2002 | Carothers et al. .......... | 705/43 |
| 2002/0059183 | A1 | 5/2002 | Chen | |
| 2002/0062237 | A1 | 5/2002 | Matsumoto et al. | |

(Continued)

OTHER PUBLICATIONS

Unknown, "About BAM Dynamic Infrastructure", Microsoft BizTalk Server 2004, printed Apr. 26, 2005, 1, http://msdn.microsoft.com/library/default.asp?url=/library/en-us/sdk/htm/ebiz_prog_bam2_gvze.asp?frame=true, USA.

(Continued)

*Primary Examiner*—Neveen Abel Jalil
*Assistant Examiner*—Kellye D Buckingham
(74) *Attorney, Agent, or Firm*—Senniger Powers LLP

(57) ABSTRACT

System and method for notifying a user of an occurrence of a defined condition in a process. The process includes a plurality of event records associated with the process; each of the plurality of event records includes a plurality of data fields having data relating to the process. A subset of the plurality of event records is defined where the subset relates to the defined condition. The data in the defined subset is updated at a predetermined time interval. The user is notified when the updated data of the defined subset indicates that the defined condition has occurred. The subset may alternatively be defined as a function of a current time, a last run time and the defined condition.

17 Claims, 9 Drawing Sheets

U.S. PATENT DOCUMENTS

| | | | |
|---|---|---|---|
| 2002/0128925 A1 | 9/2002 | Angeles | 705/26 |
| 2002/0138316 A1 | 9/2002 | Katz et al. | |
| 2002/0147622 A1 | 10/2002 | Drolet et al. | |
| 2003/0018643 A1 | 1/2003 | Mi et al. | 707/10 |
| 2003/0033180 A1 | 2/2003 | Shekar et al. | 705/7 |
| 2003/0084127 A1 | 5/2003 | Budhiraja et al. | 709/220 |
| 2003/0181991 A1* | 9/2003 | Chau et al. | 700/1 |
| 2003/0208392 A1 | 11/2003 | Shekar et al. | 705/8 |
| 2003/0225820 A1 | 12/2003 | Chkodrov et al. | |
| 2003/0229652 A1 | 12/2003 | Bakalash et al. | 707/200 |
| 2004/0078464 A1 | 4/2004 | Rajan et al. | 709/224 |
| 2004/0093381 A1 | 5/2004 | Hodges et al. | 709/204 |
| 2004/0098358 A1 | 5/2004 | Roediger | 706/106 |
| 2004/0153329 A1 | 8/2004 | Casati et al. | |
| 2004/0158429 A1 | 8/2004 | Bary et al. | |
| 2004/0172409 A1 | 9/2004 | James | 707/104.1 |
| 2004/0177053 A1 | 9/2004 | Donoho et al. | |
| 2004/0220910 A1 | 11/2004 | Zang et al. | 707/3 |
| 2005/0021348 A1 | 1/2005 | Chan et al. | |
| 2005/0071320 A1 | 3/2005 | Chkodrov et al. | |
| 2005/0071347 A1 | 3/2005 | Chau et al. | 707/100 |
| 2005/0102185 A1 | 5/2005 | Barker et al. | |
| 2005/0154628 A1 | 7/2005 | Eckart et al. | 705/10 |
| 2005/0216482 A1 | 9/2005 | Ponessa | 707/100 |
| 2006/0018643 A1 | 1/2006 | Stavely et al. | 396/55 |
| 2006/0053120 A1 | 3/2006 | Shum et al. | 707/100 |
| 2006/0085473 A1 | 4/2006 | Thormaehlen et al. | |
| 2006/0089861 A1* | 4/2006 | King et al. | 705/4 |
| 2006/0122872 A1 | 6/2006 | Stevens et al. | 702/19 |
| 2006/0173668 A1 | 8/2006 | Haigh et al. | 703/17 |
| 2006/0177058 A1 | 8/2006 | Sarwono et al. | 380/211 |
| 2007/0107052 A1 | 5/2007 | Cangini et al. | 726/22 |
| 2008/0120283 A1 | 5/2008 | Liu et al. | |
| 2008/0301175 A1 | 12/2008 | Applebaum et al. | |

OTHER PUBLICATIONS

Unknown, "Activity Data Storage", Microsoft BizTalk Server 2004, printed Apr. 26, 2005, 4, http://msdn.microsoft.com/library/default.asp?url=/library/en-us/sdk/htm/ebiz_prog_bam_hbeb.asp, USA.

Unknown, "Query Instance Data", Microsoft BizTalk Server 2004, printed Apr. 26, 2005, 1, http://msdn.microsoft.com/library/default.asp?url=/library/en-us/sdk/htm/ebiz_prog_bam2_ksgp.asp, USA.

Unknown, "BAM Definition Schema", Microsoft BizTalk Server 2004, printed Apr. 26, 2005, 2, http://msdn.microsoft.com/library/default.asp?url=/library/en-us/sdk/htm/ebiz_prog_bam2_mskn.asp, USA.

Dekhtyr el al., "Probabilistic Temporal Databases, 1:Algebra," ACM Transactions on Database Systems (TODS), Aug. 31, 2001, pp. 41-95, vol. 26, Issue 1, USA.

Flinn et al., "Coordinating Heterogeneous Time-Based Media Between Independent Applications," Proceedings of the Third ACM International Conference on Multimedia, Nov. 5-9, 1995, pp. 1-17, USA.

Kappel, et al., "A Behavior Integrated Entity-Relationship Approach for the Design of Object-Oriented Databases," Institute of Electrical Engineers, 1989, pp. 311-328, Elsevier Science Publishers, USA.

Le Viet et al., "Design and Implementation of a Relational Database Server in a Heterogeneous Network Environment," International Conference on Data Engineering, Feb. 5-7, 1986, pp. 685-692, IEEE Computer Society Press, USA.

Unknown, "Introducing SQL Server Notification Services", SQL Server Notification Services Books Online, printed Apr. 26, 2005, 2, http://msdn.microsoft.com/library/default.asp?url=/library/en-us/sqlntsv/htm/ns_overarch_6mia.asp, USA.

Unknown, "Advanced Query Tuning Concepts", Optimizing Database Performance, printed Apr. 26, 2005, 1, http://msdn.microsoft.com/library/default.asp?url=/library/en-us/optimsql/odp_tun_1_8pv7.asp, USA.

Unknown, "Defining Chronicle Tables", SQL Server Notification Services Books Online, printed Apr. 26, 2005, 2, http://msdn.microsoft.com/library/default.asp?url=/library/en-us/sqlntsv/htm/nsp_eventsandproviders_5kdw.asp, USA.

Unknown, "Subscription Processing Architecture", SQL Server Notification Services Books Online, printed Apr. 26, 2005, 2, http://msdn.microsoft.com/library/default.asp?url=/library/en-us/sqlntsv/htm/ns_overarch_02ye.asp, USA.

Connie Dialeris Green, "Oracle9a Database Performance Tuning Guide and Reference, Release 2 (9.2)," 2002, Oracle Corporation, pp. xxii, 2-13-2-14, 5-39-5-42, 6-7-6-8, 12-2-12-12.

Pivk, Aleksander, "Intelligent Agents in E-Commerce," Electronic Review Slovenia, Pub 2000, 18 pages.

Schiefer, J. et al, "Process information factory: a data management approach for enhancing business process intelligence," Published Jul. 6-9, 2004, IEEE.

* cited by examiner

| PO# | RecvTime | City | Quantity | ShipTime | DeliveryTime |
|---|---|---|---|---|---|
| 123 | 8:00am | Seattle | 150 | 8:24am | 12:45pm |
| 124 | 8:30am | Seattle | 234 | 8:45am | 1:20pm |
| 125 | 8:35am | Redmond | 87 | 9:05am | 2:30pm |
| 126 | 8:45am | Seattle | 450 | 9:20am | 3:10pm |
| 127 | 8:55am | Redmond | 200 | 9:30am | <NULL> |
| 128 | 8:57am | Seattle | 340 | 9:20am | 3:05pm |
| 129 | 9:12am | Seattle | 120 | 9:45am | <NULL> |
| 130 | 9:30am | Redmond | 25 | 10:15am | <NULL> |
| 131 | 9:45am | Seattle | 250 | 10:35am | <NULL> |
| 132 | 10:00am | Redmond | 100 | <NULL> | <NULL> |
| 133 | 10:15am | Seattle | 230 | <NULL> | <NULL> |
| 134 | 10:25am | Redmond | 45 | <NULL> | <NULL> |
| ... | ... | ... | ... | ... | ... |

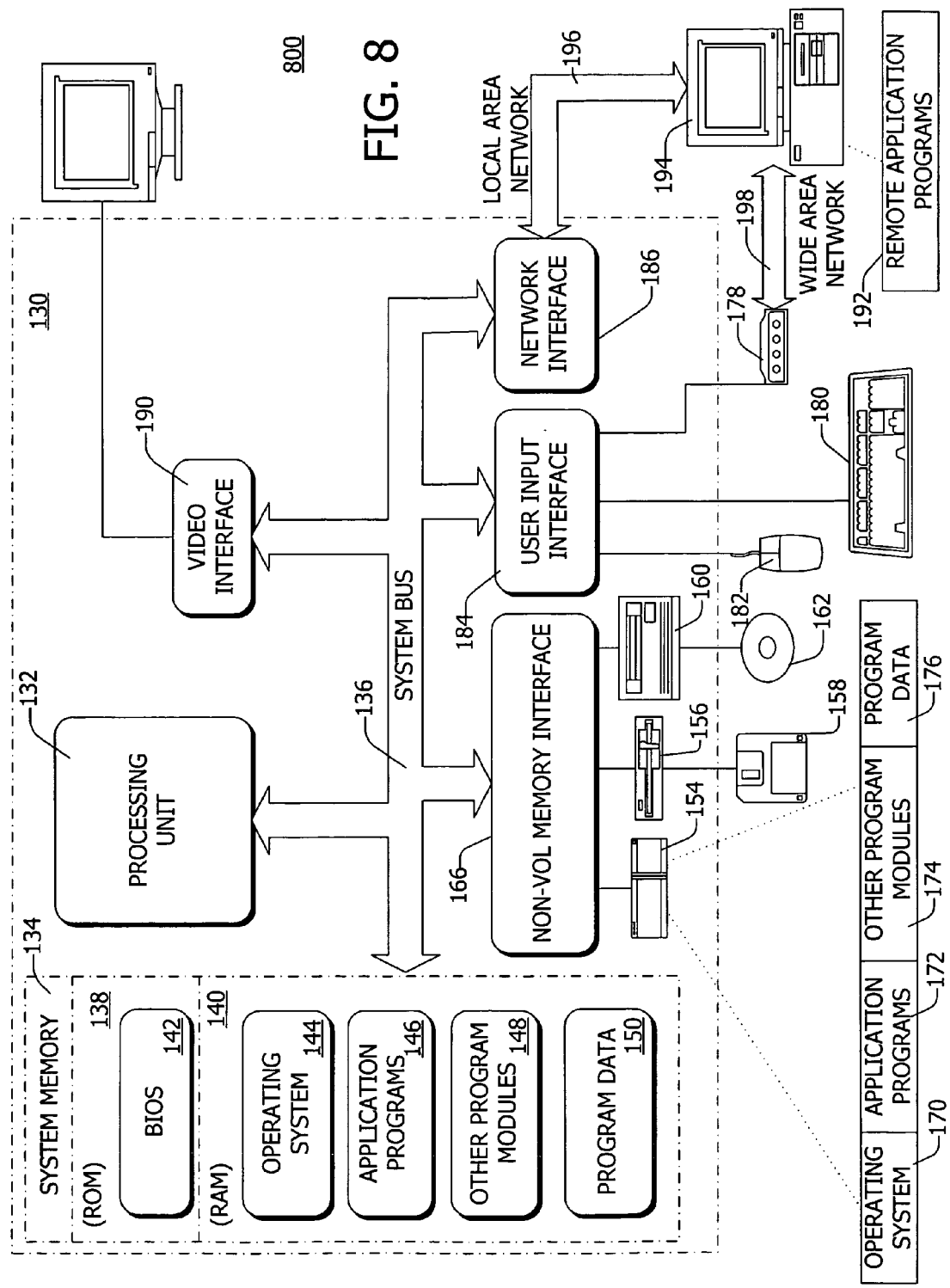

BUSINESS ALERTS ON PROCESS INSTANCES BASED ON DEFINED CONDITIONS

TECHNICAL FIELD

Embodiments of the present invention generally relate to the field of business process notifications. In particular, embodiments of this invention relate to notifying a user of an occurrence of a defined condition in a process by pre-correlating business event data.

BACKGROUND OF THE INVENTION

Business entities engage in numerous activities based on a variety of automated processes (e.g., relying on computerized activities and business software applications) and operations based on human actions (e.g., phone calls, faxes, e-mails, etc.). As a result, obtaining an accurate snapshot of "what is going on with the business" becomes more complex and critical for businesses to make quick decisions to leverage market opportunities, to respond in a timely manner, to gain an advantage or to prevent losses.

Businesses and other organizations use computers, and in particular, computer database applications, to monitor and record information about organizational activities. Often, an organization will have recurring processes or activities that must be performed. Indeed, it is common for an organization to have numerous instances of an activity in various stages of completion at any given time. As one example, a business may sell goods based on orders received from customers. An activity or a process of interest may be fulfilling those customer orders; each purchase order represents a separate instance of that activity or process. At any particular time, that business may have multiple instances of the activity (i.e., multiple orders from multiple customers) in various stages of completion. As another example, a financial institution may loan funds to customers based on applications from those customers. An activity of interest may be the processing of a loan application to completion (e.g., approval or rejection), with each loan application representing a separate instance of the activity. At any particular time, there may be multiple loan application instances in various stages of processing. As yet another example, a governmental entity responsible for issuing permits may have multiple permit applications in various stages of being processed.

In facilitating management of business activities, a system known as a "Business Activity Monitor" (BAM) concentrates and analyzes data from and for heterogeneous event sources in an attempt to present a single real-time view of the business state, status, trends, and critical conditions. Businesses or enterprise entities that successfully monitor business activities will be able to make decisions faster based on more relevant data and, therefore, will gain significant advantages. Such a business that can make decisions in real-time is sometimes referred to as a "Zero Latency Enterprise" (ZLE).

Currently, existing systems provide notifications or alerts to users upon an occurrence of an event in a process or an activity. For example, a sales manager may wish to be notified when purchase order #123 from Customer A is shipped. Or, a manager in an accounting department may wish to be notified when an event such as the delivery status of purchase order #223 from Customer B so that she may issue an invoice to Customer B.

The existing systems, however, require that the software developers statically hard-code the notification conditions in the existing systems for the users. The existing systems also expect that the software developers set or predict conditions for a given specific situation. For example, suppose Merchant X establishes an agreement with Customer A that Customer A would not pay for shipping costs for any order placed by Customer A that are not shipped within two hours after the orders are received by Merchant X. Consequently, Merchant X's sales manager may wish to be notified when any purchase order placed by Customer A is not shipped within two hours after the order is received. In other words, instead of being notified when an event (e.g., order received, order approved, order shipped, or the like) has happened to a particular order, Merchant X's sales manager wishes to know the occurrence of a defined condition to any instance of the process (e.g., the existence of one or more unfulfilled purchase orders received more than 90, 105 or 120 minutes ago).

Under the existing systems, Merchant X's sales manager may need to specifically request that the software be adapted to his needs and to accommodate the agreement with Customer A. In addition, when Merchant X's sales manager wishes to change the notification conditions due to changes to the agreement with Customer A, the software developer may be required to modify the existing systems so that Merchant X's sales manager receives the correct notification.

In addition, some existing event alert or notification systems inefficiently evaluate the set of data or records to determine whether the event has happened. For example, some existing system would execute a query against all purchase orders' data constantly to determine whether the event happened. As the purchase order data increases, the existing system spends a substantial amount of resources to perform tasks, such as receiving the purchase orders, creating purchase order records, receiving updated data on purchase orders, correlating updated data with the purchase order records, processing all the purchase order data, or the like. In addition, the same set of data may constantly being updated or modified. As a result, these existing systems require considerable resources to accommodate these modifications or changes to the data, not to mention the need to evaluate data to determine whether a notification needs to be issued.

Accordingly, improvements in business process notifications by pre-correlating a set of data from multiple instances of business processes or activities before notifying the users are desired to address one or more of these and other disadvantages.

SUMMARY OF THE INVENTION

Embodiments of the present invention overcome shortcomings of prior art by pre-correlating a plurality of updated data from a plurality of instances or event records such that systems would execute user queries against a subset of the plurality of instances or event records to determine whether the defined condition has occurred. Consequently, instead of evaluating a complete and voluminous set of event records, embodiments of the present invention define a subset of event records and notify the user of the occurrence of the defined condition from the defined subset. In addition, embodiments of the present invention advantageously notify the user when the defined condition has occurred in instances of the process when data in the defined subset may be unavailable.

According to one aspect of the invention, a method notifies a user of an occurrence of a defined condition in a process including a plurality of event records associated with the process. Each of the plurality of event records includes a plurality of data fields having data relating to the process. The method defines a subset of the plurality of event records where the subset relates to the defined condition. The data in the defined subset is updated at a predetermined interval. The method notifies the user when the updated data of the defined subset indicates that the defined condition has occurred.

In accordance with another aspect of the invention, a system notifies a user of an occurrence of a defined condition in a process including a plurality of event records associated with the process. Each of the plurality of event records includes a plurality of data fields having data relating to the process. An event provider defines a subset of the plurality of event records where the subset relates to the defined condition. The event provider also updates the data in the subset of the plurality of event records at a predetermined time interval. A notification component notifies the user when the updated data of the defined subset indicates that the defined condition has occurred.

According a further aspect of the invention, one or more computer-readable media have computer-executable components for notifying a user of an occurrence of a defined condition in a process including a plurality of event records associated with the process. Each of the plurality of event records includes a plurality of data fields having data relating to the process. An event provider pre-correlates data with a subset of the plurality of event records wherein the subset relates to the defined condition. The event provider also updates the data in the defined subset at a predetermined time interval. A notification component notifies the user when the updated data of the defined subset indicates that the defined condition has occurred.

Alternatively, the invention may comprise various other methods and apparatuses.

Other features will be in part apparent and in part pointed out hereinafter.

BRIEF DESCRIPTION OF THE DRAWINGS

FIG. 8 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
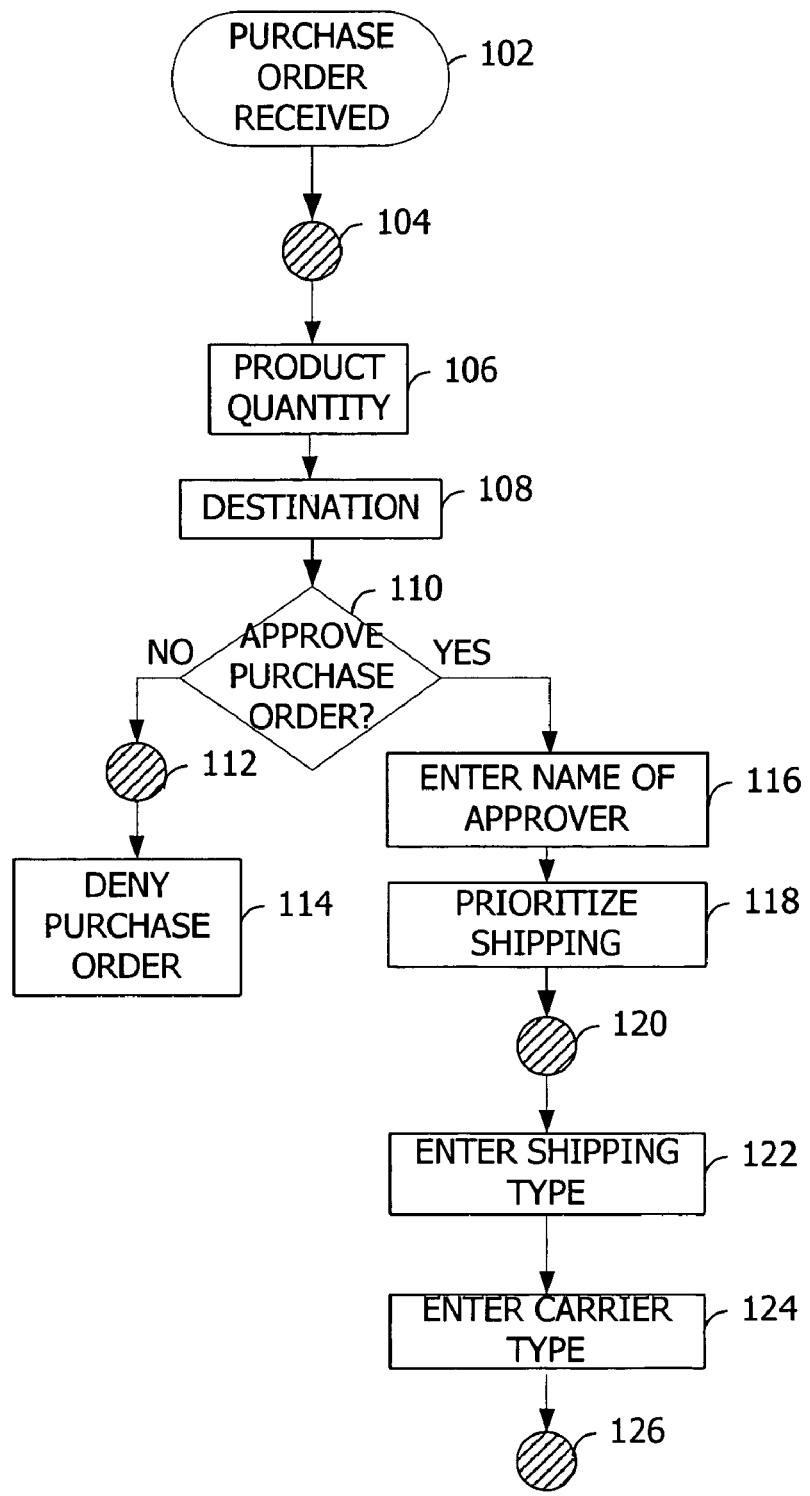
FIG. 1 is a flow diagram illustrating an example of business activity according to one embodiment of the invention.

Referring first to FIG. 1, an exemplary flow diagram illustrates an example of a typical business activity such as purchase order processing according to one embodiment of the invention. Business processes include automated activities (e.g., completion of updating software applications, sales processes, or purchase order processing), physical activities (e.g., a truck driver delivering a package to a recipient), or a combination of both. In another example, business processes include a sequence of steps for achieving a business goal (e.g., a sales transaction). The business processes take time to execute and each step may be done at different location, organization, or the like. In order to better manage the business processes or activities, single changes of state to steps in a process, such as events, are monitored.

In the illustrated embodiment, a purchase order is initially received at 102. It is to be understood that a plurality of instances of purchase orders may be received and each instance of purchase orders includes a set of data relating to the purchase order. In managing multiple instances of a business activity, one useful and desirable function is to be notified when a condition has occurred to any given instance of the process (e.g., an occurrence of a defined condition in the business process). For example, one may be interested to be notified "How many orders with a price above $500.00 has not shipped in 24 hours?"

At 104, the purchase order reaches a milestone and at this milestone, data of the purchase order is received or recorded. For example, data of the purchase order includes the date when purchase order was received, the name of the person who took the purchase order, the name of the person who placed the purchase order or the like. It is to be understood that the milestone at 104 may be a stage of completion of certain tasks. As discussed earlier, many instances of purchase order activity may be running simultaneously and each instance may reach different stages of completion. Advantageously, current time may be collected when a milestone is reached (e.g., at 104, 112, 120 and 126).

At 106, data relating to the product quantity of the purchase order is collected. At 108, data associated with the shipping destination defined in the purchase order is collected. At 110, a user determines whether to approve the purchase order. If the user determines to deny the purchase order, data of the time of the denial is collected at 112 and the decision to deny the purchase order is collected at 114. On the other hand, if the status of the purchase order is "approved", data including the name of the approver is collected at 116 and shipping is prioritized at 118. Once again, the purchase order activity reaches a milestone 120 and data relating to time and/or other data is collected. Next, data associated with the type of shipping for the deliverables of the purchase order is entered or collected at 122 before at 124 when the carrier type data is collected. The purchase order activity reaches another milestone at 126.

While FIG. 1 describes a typical purchase order activity, it is to be understood that other business activities with relevant milestones or stages of completions may be implemented without departing from the scope of the present invention. In addition, the types of data collected in describing FIG. 1 are used for exemplary purposes and not by means of limitations. Other operational data relating to a business activity may be collected for future queries and analysis.

Other examples of business processes or activities include health care management in a hospital. For example, many patients check into the hospital everyday with each patient requiring individual attention and diagnosis from doctors. In order to receive the proper treatment, the patient may go through a number of stages as she checks into the hospital. For example, a nurse may first obtain personal and medical history data from the patient before basic physiological data are measured, such as blood pressure, weight, height, or the like data. The patient may next be preliminarily interviewed by doctors. Similarly, the patient may visit different departments (e.g., radiology technician for taking a chest x-ray) before seeing the treating doctor. As such, the hospital management may define a plurality of data fields having data relating to the process. For example, as the patient is checked in, a "Check-in" data field may record a time data indicating when the patient was checked in. Other data fields, such as patient name, treating doctor name, or the like may be included.

Each checked-in patient represents an instance in this process of obtaining health care services. In monitoring the process, hospital management personnel may wish to know the quality of health care by evaluating how fast patients are being interviewed or treated by doctors. As such, a managing doctor in the neurology department may wish to be notified when any patient has not been interviewed by a doctor within two hours after the patient has checked in. On the other hand, a managing physician in the oncology department may wish to know any patient who has not received a follow-up by a doctor with 7 days after receiving a radiation treatment.

Figure 2:
FIG. 2 is an exemplary table containing data for supporting the business activity processing depicted in FIG. 1 according to one embodiment of the invention.

FIG. 2 is an exemplary table containing data for supporting the purchase order processing depicted in FIG. 1 according to one embodiment of the invention. FIG. 2 illustrates a table including a plurality of purchase orders having a plurality data fields with data relating to the process. Each row represents an event record in the process and FIG. 2 represents a collection of event records in the process. As shown in FIG. 2, when a new purchase order is received, a new row will be created in the table. Each column (e.g., RecvTime, City, Customer, Quantity, or the like) represents data collected at each milestone or a stage of completion and other data may be collected. Once a purchase order is approved and shipped, the "ShipTime" will be set to a non-null value. Finally, when the shipment of the purchase order is received and confirmed, the DeliveryTime will be set to a non-null value. For example, purchase order ("PO") #123 has an order reception time of 8:00 am with a delivery destination city of Seattle. The PO #123 requests a quantity of 150 units and this order was shipped at 8:24 am and it was delivered at 12:45 pm. In row 204, PO #127 has an entry <NULL> for its delivery time indicating that this order has not been delivered or such information is not available yet. In one embodiment, the table in FIG. 2 may be used as a table for process query in a typical SQL query.

While FIG. 2 illustrates a typical table for a P.O. process according to one embodiment, other data structures may be used, such as described in a commonly assigned U.S. patent application Ser. No. 10/750,885, filed on Jan. 5, 2004, entitled "CORRELATING PROCESS INSTANCE DATA ACROSS MULTIPLE APPLICATIONS", the entire disclosure of which is incorporated herein by reference. For example, if the data provided in the table in FIG. 2 is stored in one database, a business user may formulate queries against this table using a client user interface (e.g., either through an application that connects directly to the database that stores the data or via intermediate web pages and web services). Because all the data relating to the business activity is stored in one database in this illustrated example, FIG. 2 is sufficient to make the data available in a table.

As depicted in FIG. 2, data structures such as tables enable users manage business activities or processes. However, the users customarily do not monitor all instances of purchase orders; they would like to be notified when data indicates a defined condition has occurred in any instance of a purchase order handling process.

For example, instead of being notified when a particular purchase order has been shipped, a sales manager may wish to be notified when any instance of a purchase orders in a process (e.g., purchase order fulfillment) requesting over 500 units of particular merchandise so as to ensure the availability of the merchandize in the inventory. On the other hand, a shipping department manager for a group of apple farmers may wish to be notified based on a different condition, such as when any purchase order is not shipped within three days, because apples may not be fresh by the time the customers receive their orders. In another example, a customer service representative may wish to be notified when any purchase order is delivered to a customer so she may speak to the customer in person. Similarly, an accounting department manager may wish to be notified when any purchase order from a particular customer has been delivered so that she may prepare invoices to the customer.

In a further example, merchants and customers customarily establish Service Level Agreements (SLAs) or other similar agreements to govern transactions or activities between the parties. For example, provisions of a SLA may provide that if Customer A places a purchase order with a total price of $5,000.00 or more before 9:00 am EST, Merchant X agrees to ship the purchase orders within two hours. Otherwise, the parties agree that Merchant X would ship the purchase order at no cost to Customer A or other agreed penalty between the parties. Likewise, Merchant X may establish a similar SLA with Customer B or other customers depending on the specific needs of the customers. For example, Merchant X may establish the following SLAs with Customer "ABC", "CDE", and "XYZ":

a. Purchase orders placed by Customer ABC must be shipped (1) within two hours from the time of ordering if the price of the orders ranges from $500.00 to $1000.00 or (2) within eight hours if the price of the orders ranges from $1,000.00 to $10,000.00. Otherwise, the shipping department manager, Joe, needs to notify Customer ABC and explains the reason for the delay.
 b. Purchase orders placed by Customer CDE with a price ranging from $100.00 to $1,000.00 must be shipped within six hours from the time of ordering. A regional customer service representative, Mary, is responsible for notifying Customer CDE when the condition is not met.
 c. Purchase orders placed by Customer XYZ must be shipped in five hours if the price for each order is below $5,000.00, and Jane is responsible for this commitment.

One simple implementation to meet Merchant X's needs in the above examples is to execute the defined conditions against a table or a data structure containing all data to determine whether the defined conditions have occurred. However, such implementation may be inefficient in certain processes because constantly maintaining a table with all event records in the process requires substantial computing and processing resources from the system. For example, suppose Merchant X maintains a table shown in FIG. 2 containing 10,000 event records (i.e., instances) in a purchase order fulfillment process at the beginning of a business day. In addition, about 1,000 new event records are collected every two minutes, which further increases the size of the table. In meeting a defined condition provided in the SLA as agreed between the parties, the system is required to periodically monitor the event records to determine whether defined condition has occurred (i.e., POs placed by Customer ABC must be shipped (1) within two hours from the time of ordering if the price of the orders ranges from $500.00 to $1000.00 or (2) within eight hours if the price of the orders ranges from $1,000.00 to $10,000.00). In addition, the system would also need to execute the conditions defined by other users. As such, the system would be required to monitor each event record as data is collected, update data in each event record, and execute the defined condition against all event records. In contrast, embodiments of the present invention overcome the deficiencies of prior art by efficiently defining a subset of a plurality of event records where the subset relates to the defined conditions before determining whether the defined conditions have occurred.

Figure 3:
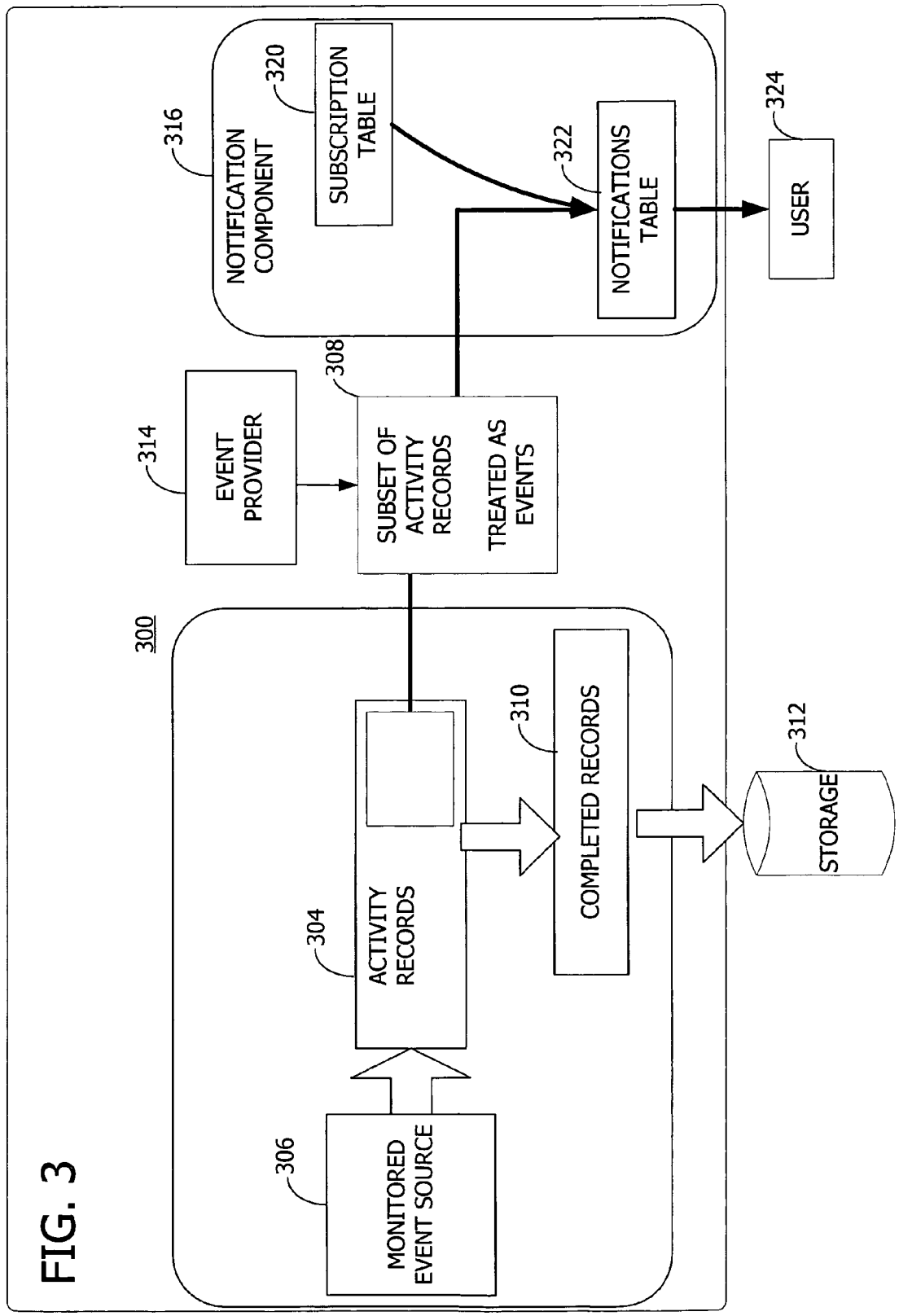
FIG. 3 is a block diagram illustrating a system for notifying a user of an occurrence of a defined condition in a process according to one embodiment of the invention.

FIG. 3 is a block diagram illustrating a system 300 for notifying a user of an occurrence of a defined condition in a process according to one embodiment of the invention. The system 300 may be a computerized system, such as a system 130 as shown in FIG. 8, including an event provider 314, a notification component 316, and a storage 312. In another embodiment, system 300 comprises a computing device, a server computer, a set of server computers connected by a common communication network, a software application, a set of software applications, or the like. In yet another embodiment, system 300 includes database management software applications for managing a plurality of event records in the process, such as a process of purchase order fulfillment. Implementation of system 300 in other processes or activities, such as manufacturing of goods, handling of negotiable instruments, or the like may be applied without departing from the scope of the present invention. Also, it is to be understood that the event provider 314, and the notification component 316 comprise a set of computer-executable instructions, software, a software application, a set of software applications, or a combination thereof for executing and/or configuring functions of the event provider 314, and the notification component 316.

Figure 4:
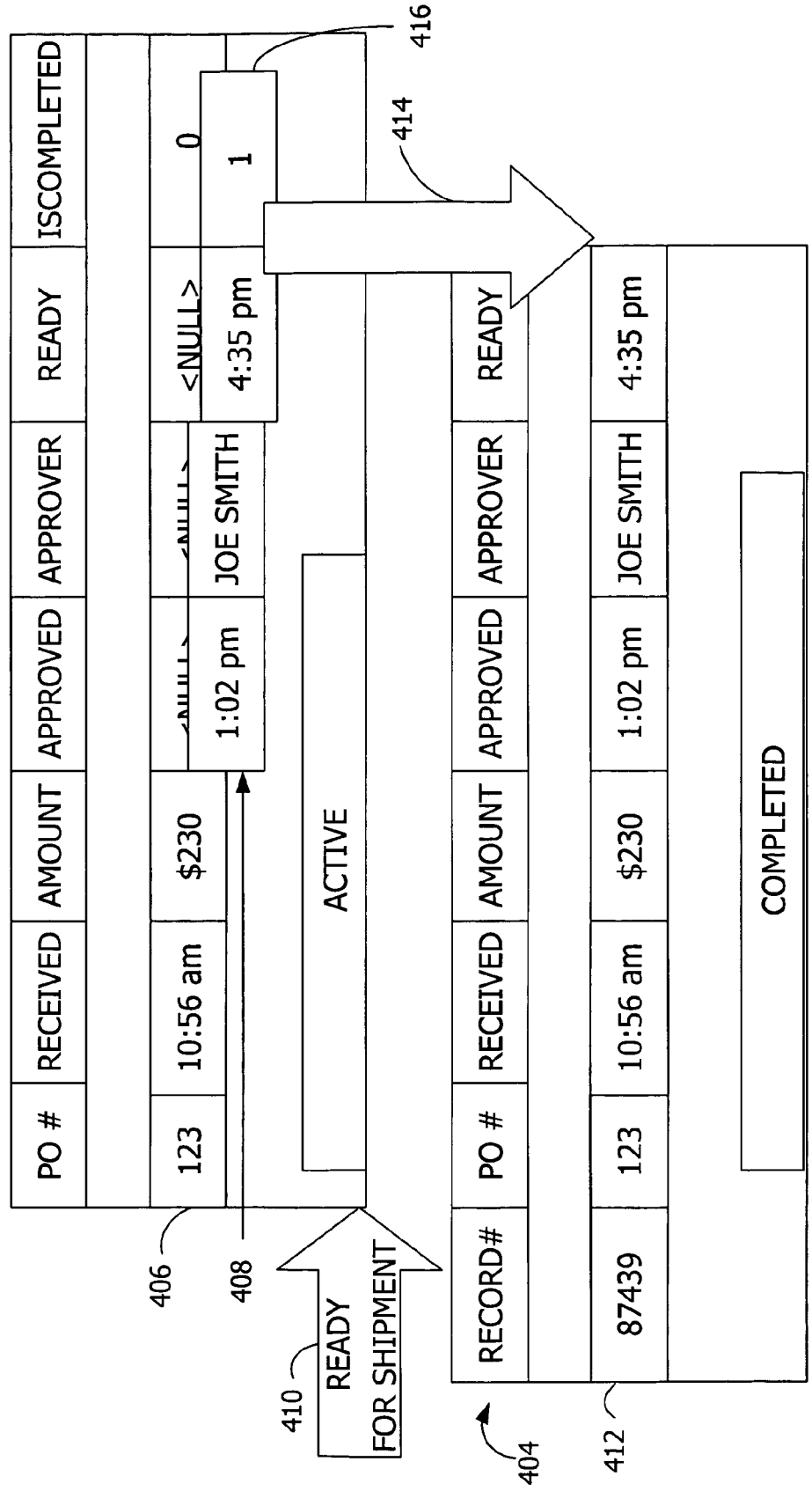
FIG. 4 is a diagram illustrating an exemplary event record with a plurality of data fields according to one embodiment of the invention.

The event provider 314 receives a plurality of events relating to a business activity. For example, FIG. 4 is a diagram illustrating an exemplary activity record with a plurality of data fields according to one embodiment of the invention. Initially, an active table 402 includes PO #123 with only limited data in the data fields for an event record 406, such as the PO #, the time when the PO was received and the total price of the PO. The data for other data fields, such as "Approved Time", "Approver", "Ready" or "IsCompleted", is not yet available. Consequently, the table 402 is synchronized with a monitored event source 306 or collects additional data relating to the purchase order process at a regular time interval. A row 408 next indicates that data such as "Approved Time" and "Approver" for activity record 406 becomes available. As a result, the data fields in event record 406 are modified. Similarly, a row 416 indicates that data such as "Ready" and "IsCompleted" is available and activity record 406 is updated accordingly. As all data fields of the event record 406 are populated with corresponding data, the event record 402 is moved or directed to a completed table 404 (e.g., a completed activity record 412) which includes activity records that have been completed.

Referring again to FIG. 3, as an example of one embodiment, FIG. 3 will be described using examples relating to Merchant X managing processes and activities with customers including Customer ABC, CDE and XYZ. System 300 listens for monitoring events from the monitored event source 306 relating to the process. For example, system 300 may include a user interface (UI) or application programming interface (API) (not shown) to collect events from the monitored event source 306. It is also to be understood by those skilled in the art that the events from the monitored event source 306 may include identifying keys or elements such as ID#, encryption keys, or other identifying methods to associate the data with a corresponding activity. Each record in activity records 304 represents an instance of the process. For example, when a PO #123 is received at 8:00 A.M. requesting a quantity of 150 units, a new activity record PO #123 is inserted in the activity records 304. Data in the plurality of data fields include data relating to values measured in time, values measured in quantity, values measured in currency, or the like. For example, for a "Received" data field, the corresponding data may be "10:00 A.M." or "five hours from current time" while for a "Customer Name" data field, the corresponding data may be "ABC" or "Smith".

Referring again to FIG. 3, the correlation of events into the activity records 304 allows all the data for the process instance to be accumulated and to be sent as a single event to the notification component 316. To achieve this, event provider 314 identifies or defines the records of interest (e.g., the subset 308) and submits the subset 308 including events to the notification component 316 which will evaluate the subset 308 against conditions (e.g., subscriptions) defined by all users. For example, the sales department manager of Merchant X may define a condition that he wishes to be notified when purchase orders placed by Customer ABC are not shipped within two hours from the time the order is received if the price of the orders ranges from $500.00 to $1,000.00. He may also wish to be notified if orders are not shipped within eight hours from order reception time if the price of the orders ranges from $1,000.00 to $10,000.00. As an illustration, when Customer ABC places a PO #245 that is received at 10:34 A.M. with a total price of $668.00, the event provider 314 identifies PO #245 to be included in the subset 308 of the collection of event records 304 because PO #245 was recently changed. The notification component 316 determines that this relates to the condition defined by the sales manager. Similarly, other subscriptions can be defined as queries about the behavior and data of the process instances.

It is important to note that instead of executing those queries directly against the data in the tables 304 and 310, the event provider 314 picks the relevant records in the subset 308 and offloads the subscription evaluation to the notification component 316. As such, in one embodiment, the work between the pre-correlation system comprising of tables 304 and 310 in the database 312 and the notification component 316 is separated. For example, if there are thousands of subscribing users, this will not affect the general storage of activity data for analysis in the database 312.

Figure 5:
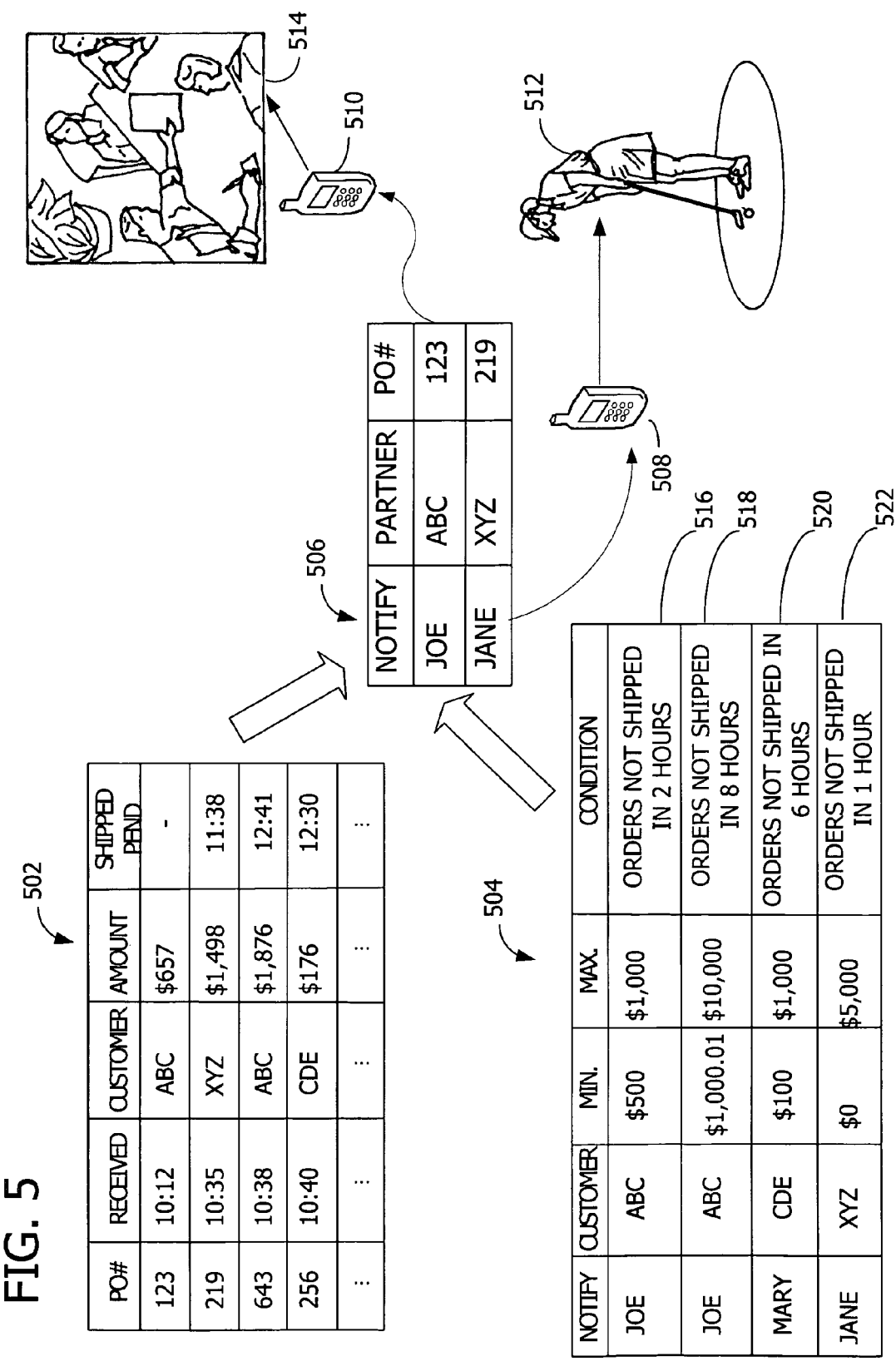
FIG. 5 is a diagram illustrating notifying the user of an occurrence of a defined condition in a process using a subscription table according to one embodiment of the invention.

The notification component 316 next accesses subset 308 to determine whether the defined condition has occurred. Using PO #245 as an example, notification component 316 determines whether to notify the sales manager when PO #245 is not shipped within two hours. In one embodiment, notification component 316 includes a subscription table 320 including a plurality of users with corresponding defined conditions. The notification component 316 may also include a notification table 322 having a collection of users 324 to which the notification component 316 sends notification. FIG. 5 is a diagram illustrating a notification to the user of an occurrence of a defined condition in a process using a subscription table according to one embodiment of the invention.

A subset table 502 shows one or more event records submitted by the event provider 314. A subscription table 504 includes one or more users with corresponding defined conditions. For example, the subscription table 504 includes condition parameters for a user Joe who wishes to be notified of purchase orders placed by Customer ABC. In particular, the defined condition 516 indicates that the user Joe wishes to be notified when any Customer ABC's order with a price range from $500.00 to $1,000.00 is not shipped within two hours. In order to evaluate this defined condition, the event provider 314 compares the shipped time with received time of ABC orders between $500.00 and $1,000.00 and compares the current time with the received time of ABC orders between $500.00 and $1,000.00 that do not have a specified shipped time (See FIGS. 6A-B and 7B below for a further description on current time evaluation). Assuming the current time is after 12:41 P.M., the event provider 314 defines a subset to include PO #123 because PO #123 was received more than 2 hours ago and has not been shipped. The PO #123 may be updated and notification component 316 would notify user Joe that PO #123 has not been shipped in two hours.

As another example, the user Joe may wish to be notified when any Customer ABC's order with a price range from $1,000.01 to $10,000.00 is not shipped within eight hours. By this example, embodiments of the present invention create a subscription record 518 including a separate condition defined by the user Joe. For example, the user Joe may want to define a condition for orders between $500 and $1000 because the processing time of such orders may be 8 hours instead of 2 hours. Similarly, different users, such as Mary and Jane may define their own alert notifications as expressed by records 520 and 522.

It is to be understood that subset table 502 may include additional data fields with data relating to the process. The additional condition parameters may be set in the subscription table 504 according to the conditions defined by additional users. Also, as seen in rows 516 and 518, one user (e.g., user Joe) may define one or more conditions with separate and different parameters to meet his or her needs.

From subset table 502 and subscription table 504, notification component 316 determines that the user Joe and user Jane need to be notified as the defined conditions at rows 516 and 522, respectively, have occurred. The notification component 316 may maintain a notification table 506 including the notifying user and data from event records relating to the defined condition. For example, notification component 316 first reviews subset that PO #219 was placed by Customer XYZ requesting a total price of $1,498. The PO# 129 may be updated and may showed that it was received at 10:35 A.M. and that PO #219 was shipped at 11:38 A.M. Upon reviewing subscription table 504, notification component 316 determines that Jane's defined condition has occurred because PO #219 (having a total price range between $0.00 and $5,000.00) was not shipped within one hour. Therefore, notification component 316 notifies the user Jane 512 of PO #219 by sending a notification to a wireless device 508, such as a cell phone, a pager, a personal digital assistant (PDA), a wireless communication device, a Blackberry®, or other communication device. In one embodiment, the user Jane 512 may specify a notification means of receiving notices from notification component 316. Such notification means may include, e-mail communication, telephone communication, facsimile communication, wireless communication, or other types of communication means.

In one embodiment, the following SQL statement illustrates an exemplary implementation of notifying the user using subset table 502 and subscription table 504:

SELECT s.Notify, e.Partner, e.Amount
FROM Activities a JOIN Subscriptions s
ON a.Parnter=s.Partner
WHERE a.Amount between s.Min and s.Max AND ((a.Shipped is NULL AND a.Received<@Now-s.SLA) OR (a.Shipped-a.Received>s.SLA).

Unlike other existing systems, the notification as described in embodiments of the present invention is not a notification based on the individual or single events such as "PO Received" and "PO Shipped". Instead, the notification is formulated as a query about the process instances, based on data from both events that were pre-correlated into the same activity record. Once the events were pre-correlated or accumulated, notification component 316 and methods may be used to evaluate the subscription by treating each activity as composite event. Example of such notification system may include Microsoft® SQL Server Notification Services. It is to be understood that other schema, methods, algorithms, programming routines or codes may be used to implement such functions of notification component 316.

In another embodiment, the event provider 314 determines the subset of the records as a function of a current time, a last run time, and the defined condition. For example, suppose the event provider 314 is executed every 10 minutes, and the current time is 12:50 P.M. In an example, the event provider 314 may move all the records that were modified since the last execution. For example, the record for order 643 will be included in the set 308 because the record was modified at 12:41, which is modified after the previous execution of the event provider 314 at 12:40.

In a more complex example, suppose the event provider 314 is also executed every 10 minutes, the current time is 12:50 P.M., and the following condition is defined by the user for generating a notification:
RECEIVED<"NOW—2 HOURS"
AND SHIPPED="NULL";
AND PARTNER="ABC";
AND AMOUNT>=500;
AND AMOUNT<=1000.

In the above exemplary statements, the user wishes to be notified when all Customer ABC orders between $500.00 and $1,000.00 are not shipped within two hours. At the current time of 12:50 PM, no notification will be generated because the condition "RECEIVED<'NOW—2 HOURS'" has not been satisfied. Furthermore, if there are no more events occurring for 2 hours, the records would match the condition, but the records would not be moved because they have not been recently modified.

As such, embodiments of the present invention solve the problem described above by observing that a query from the user contains two parts—a temporal part:
RECEIVED<"NOW—2 HOURS"

And a non-temporal data filter:
SHIPPED="NULL";
AND PARTNER="ABC";
AND AMOUNT>=500;
AND AMOUNT<=1000.

When this query is executed periodically, the results from the non-temporal data filter will not change, that is, all the records that matched the data filter at 10:00 A.M. will also match at 11:00 A.M., and the records that did not match at 10 A.M. will not match at 11 A.M. By only evaluating the non-temporal data filter, records will satisfy the user's query regardless of time condition. Once the temporal part of the condition is applied, however, the result is no longer true because a record with "RECEIVED=8:55 A.M." will not match the user's query when the query is executed at 10 A.M. (i.e., 8:55 A.M. is not less than 8:00 A.M. (10:00-2 hours)). However, at 11:00, the record with "RECEIVED=8:55 A.M." will match the user's query even though no events happened in the meantime.

Figure 6A:
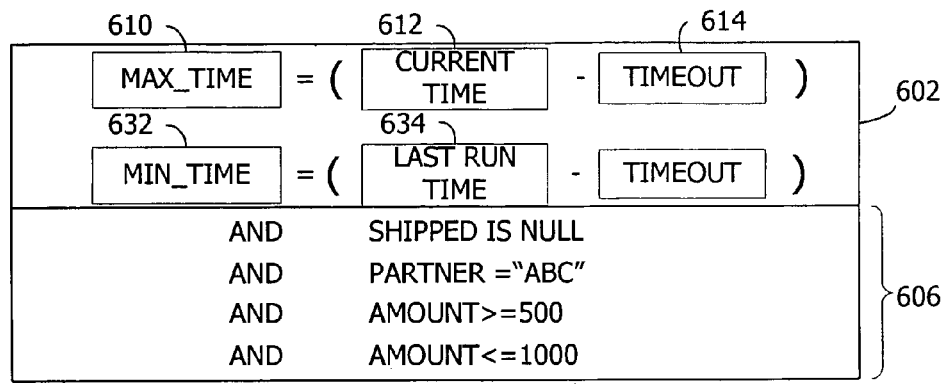
FIGS. 6A-B are diagrams illustrating notifying the user when the defined condition has occurred between the first time stamp and the second time stamp according to one embodiment of the invention.
Figure 6B:
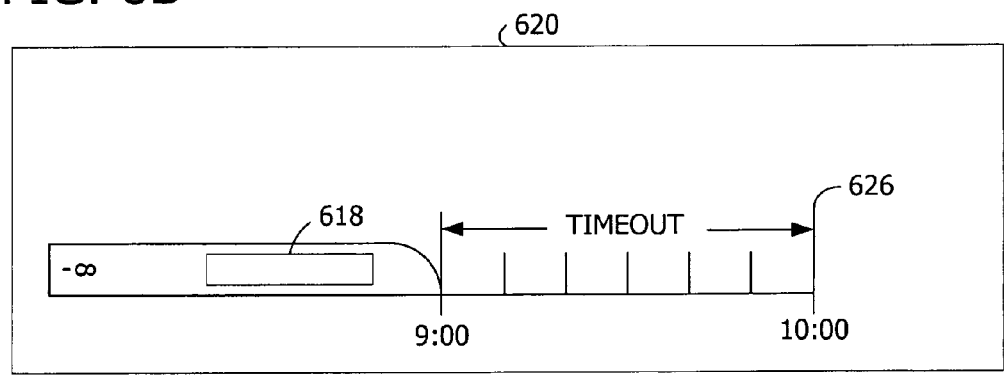
Figure 6B:
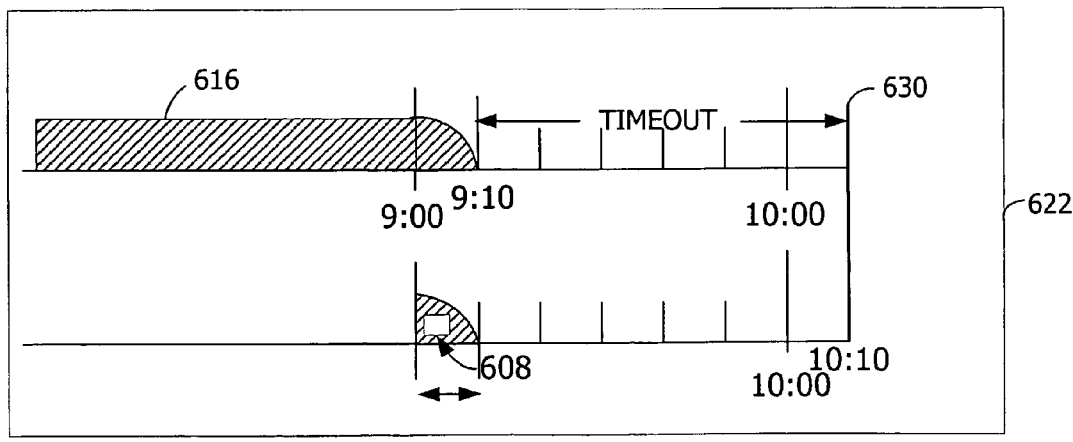

As such, embodiments of the present invention define the subset as a function of time. In such an embodiment, the event provider 314 may be configured to define a subset of the plurality of event records as a function of a current time and the defined condition. FIGS. 6A-B illustrate an implementation of such embodiment. FIG. 6A illustrates an exemplary defined condition including a plurality of data fields, such as a set of temporal fields 602 and a collection of condition fields 606. In the set of temporal fields 602, data includes values such as a Max_Time 610, a current time 612, a Min_Time 632, a LastRun Time 634, and a timeout 614 (e.g., a duration of time to measure the occurrence of the defined condition). For example, the current time 612 indicates a time when event provider 314 is currently executed. Similarly, the LastRun Time 634 indicates a time when event provider 314 was last executed. The collection of condition fields 606 includes parameters of the defined condition, such as the name of customer (e.g., Customer ABC), the range of total price (e.g., between $500 and $1,000) and the status (e.g., shipped). Additional fields may be added according to the defined condition without departing from the scope of the present invention.

In this embodiment, event provider 314 defines the subset table 502 of event records as of the set of records that match the temporal 602 part of the condition on 606. The event provider 314 defines the subset table 502 of event records in a time period specified between the Max_Time 610 and the Min_Time 632. Therefore, only the activity records that match the temporal part 602 are seen as events in the notification system 316, which then evaluates the whole condition 606 (i.e., including non-temporal data filter). As such, the work is separated between system 300 and the notification component 316, and the subscription queries are executed against relevant subset of the activity data.

FIG. 6B is a diagram which is used to illustrate how the event provider 314 defines event records relating to the defined condition which are used to create subset table 502 of event records relating to the defined condition according to Max_Time 610 and Min_Time 632. In operation, suppose a user A defines the following as a condition that she wishes to be notified of: a purchase order from Customer CDE is not shipped within an hour from the time the order was received. As such, the condition defined by user A may be presented as follows:
 Timeout="One Hour";
 PARTNER="CDE";

Initially, in block 620, when event provider 314 is defining a subset of event records for the first time at the current time 612 of 10:00 A.M, the event provider 314 would determine the Max_Time 610 in order to define event records relating to the condition defined by user A. In this example, the Max_Time 612 is 9:00 A.M. (i.e., 10:00 A.M.-1:00). As a result, event provider 314 would define a subset 618 which may include event records that were received before 9:00 A.M. In other words, event provider 314 would generate event for each of the activity records older than 9:00 AM. Those events will be then processed by the notification system 316 to evaluate the whole condition defined by user A (i.e., purchase orders of Customer CDE) received before 9:00 A.M. Consequently, notification component 316 notifies the user A when the data in the defined subset 618 indicates the defined condition has occurred.

Next, a block 622 illustrates when event provider 314 is executed after a time interval (e.g., 10 minutes). For example, if event provider 314 is defining a subset at a current time 630 of 10:10 A.M., event provider 314 would need to determine the Max_Time 610 and the Min_Time 632 in order to define event records relating to the condition defined by user A. In this illustration, the Max_Time 610 is 9:10 A.M. (i.e., 10:10-1:00) and the Min_Time 632 is 9:00 A.M. (i.e., 10:00-1:00, because the LastRun time is 10:00 A.M.). However, instead of defining event records from a subset 616 (illustrated by the shaded area), event provider 314 defines a subset 608 between the Max_Time 612 and Min_Time 632 (i.e., between 9:10 and 9:00 A.M.). In other words, at the current time of 10:10 A.M., event provider 314 would not define the subset of event records that were received before 9:00 A.M. because they were already processed the last time.

Hence, according to this embodiment, event provider 314 would define PO # 123 according to condition 516 defined by the user Joe as follows:
 TIMEOUT="2 HOURS";
 SHIPPED="NULL";
 PARTNER="ABC";
 AMOUNT>=500; AND
 AMOUNT<=1000.

The PO #123 specifies that the order from Customer ABC was received at 10:12 A.M. with a total price of $657. In order for event provider 314 to define PO #123 in the subset table 502, event provider 314 would execute at a current time of 12:20 P.M. with a LastRun time of 12:10 P.M. That is, the Max_Time 612 would be 10:20 A.M. and the Min_Time 632 would be 10:10 A.M.

It is to be assumed that the time values in the above examples are measured in the same time zone. It is to be understood that time values described above may also include references to the date and the year when the time values are measured.

While the subset described above is defined by event provider 314 with respect to time, it is to be understood that the subset may be defined with respect to any parameter or value of the condition defined by the user. Consequently, event provider 314 may define the subset by comparing relevant parameters or values defined in the condition with data values in the data fields of the event records.

Figure 7A:
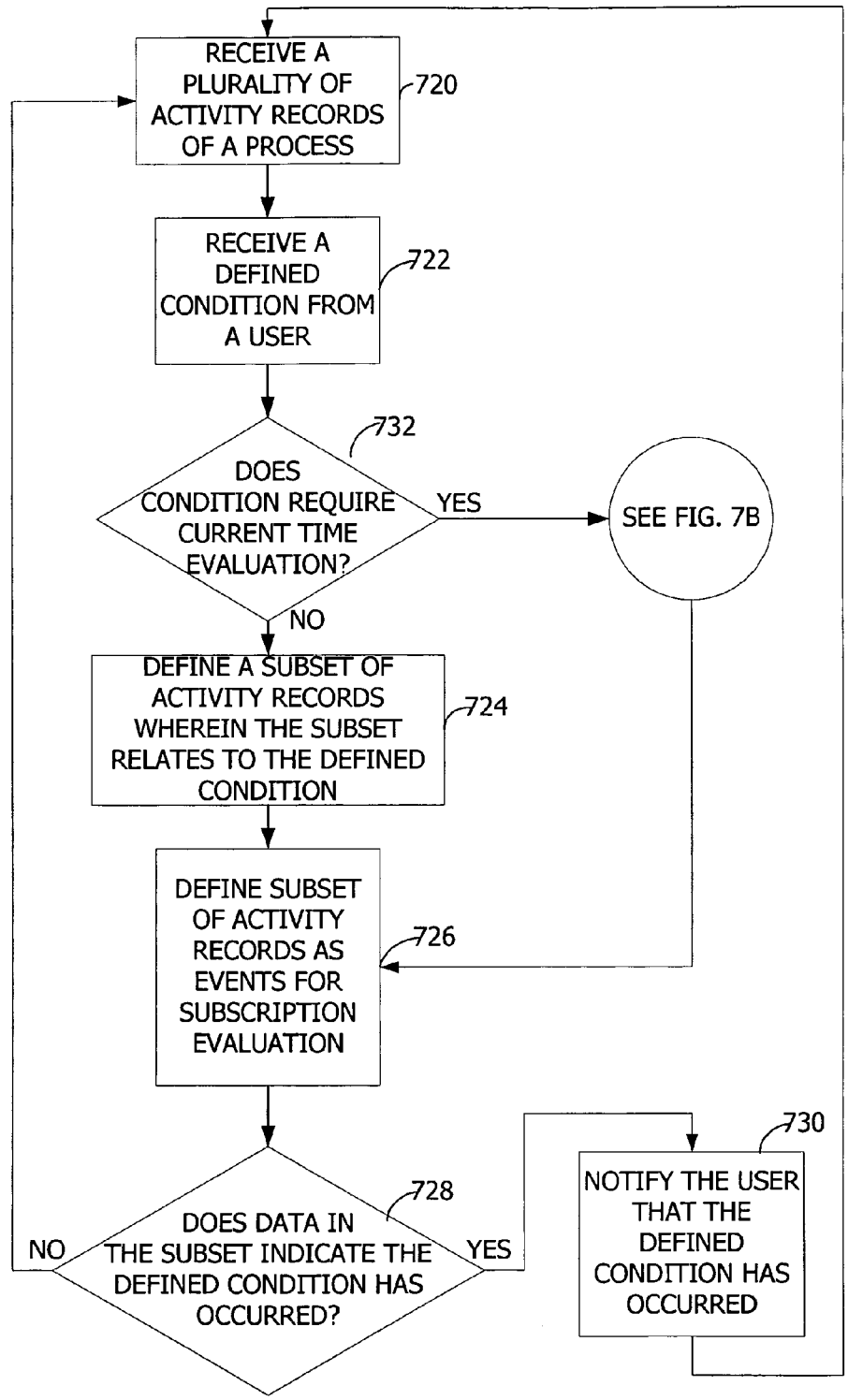
FIGS. 7A-B illustrates a flow chart of a method for notifying the user of an occurrence of a defined condition in a process according to one embodiment of the invention.
Figure 7B:
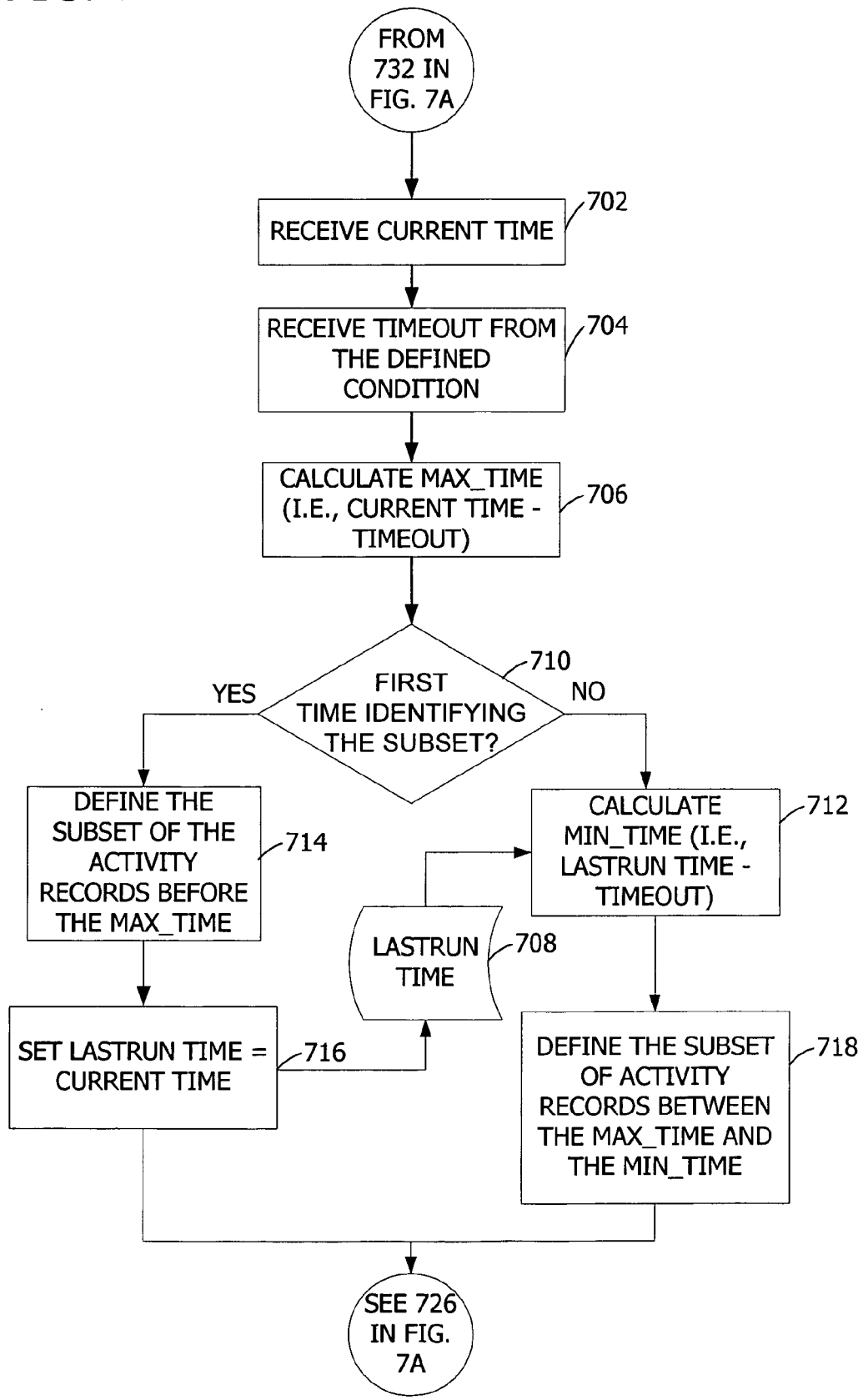

FIGS. 7A-B illustrates a flow chart of a method for notifying the user of an occurrence of a defined condition in a process according to one embodiment of the invention. At 720, a plurality of event records of a process is received by system 300. For example, system 300 receives from monitored event source 306 data relating to the process of purchase order fulfillment. At 722, the system 300 receives a condition defined by a user such that the user may be notified when the defined condition has occurred. For example, as in subscription table 504, a user Mary defines a condition that she wishes to be notified when orders from customer CDE having a price ranges from $100.00 to $1,000.00 are not shipped in six hours.

At 732, event provider 314 determines whether the condition requires a current time evaluation. If the determination is positive, event provider 314 proceeds to 702 in FIG. 7B with the current time evaluation. Using PO #123 again as an example, as the shipping time data is unavailable according to subset table 502, event provider 314 would compare the received time with the current time. On the other hand, if the determination is negative, at 724, event provider 314 defines a subset of event records wherein the subset relates to the defined condition. In other words, event provider 314 defines a subset from the plurality of event records where the event records in the subset include data relating to the defined condition. The event provider 314 will then execute on predetermined interval, and each time will identify the subset of records that match the temporal condition at 726. For example, the event provider 314 may run every 10 minutes. At 728, notification component 316 determines whether the data in the subset indicates that the defined condition has occurred. If the determination is positive, notification component 316 notifies the user that the defined condition has occurred. Alternatively, if notification component 316 determines that the defined condition has not occurred, the user would not be notified.

FIG. 7B is a flow chart illustrating how event provider 314 performs the current time evaluation after 722 from FIG. 7A. For example, event provider 314 may define a subset of the plurality of event records relating to the defined condition as a function of a current time, a LastRun time and the defined condition. At 702, event provider 314 receives a current time. That is, the current time (e.g., 10:00 A.M.) indicates a time when event provider 314 is currently defining the subset of the plurality of event records. At 704, event provider 314 receives a timeout from the defined condition. Using Mary's defined condition as an example, the timeout is six hours. The event provider 314 calculates the Max_Time at 706 by subtracting timeout from the current time (e.g., 10:00−6:00=4:00). At 710, event provider 314 determines whether it is the first time that event provider 314 defines the subset. If the determination is positive, event provider 314 defines the subset of the plurality of event records received before the Max_Time at 714. In other words, given the current time of 10:00 A.M. and the timeout of six hours, event provider 314 would define the subset of event records received before 4:00 A.M. The event provider 314 next sets a LastRun time to equal to the current time (e.g., 10:00 A.M.). The value of the LastRun time is stored for later use at 708. Consequently, the subset is updated as described above at 726 in FIG. 7A.

On the other hand, if event provider 314 determines that it is not the first time it has defined the subset, event provider 314 proceeds to calculate a Min_Time at 712 by subtracting the timeout from the LastRun time, which is available at 708. In Mary's example, suppose the LastRun time is 9:45 A.M., the Min_Time equals to 3:45 A.M. In another embodiment, the LastRun time is calculated as a function of the current time and an interval in which event provider 314 periodically defines the subset. At 718, event provider 314 defines the subset of event records in a time period between the Max_Time and the Min_Time. In other words, event provider 314 defines the subset of event records received between 3:45 A.M. and 4:00 A.M.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above systems and methods without departing from the scope of the invention, it is intended that all matter contained in the above description and shown in the accompanying drawings shall be interpreted as illustrative and not in a limiting sense.

What is claimed is:

1. A method for notifying a user of an occurrence of a defined condition, said method comprising:
   defining a process including a plurality of event records associated therewith, each of the plurality of event records including a plurality of data fields having data relating to the process, each of the plurality of event records in the process being a part of a sequence of steps for achieving the process;
   defining a subset of the plurality of event records of the process wherein the subset includes only event records which meet the defined condition, said condition being formulated as a query about process instances of the defined process, wherein each of the plurality of event records in the subset is also a part of the sequence of steps for achieving the process;
   receiving initial data for the plurality of data fields relating to the defined subset of the plurality of event records as the received initial data becomes available;
   based on the received initial data, progressively accumulating additional data relating to the received initial data and relating to the defined process as the additional data becomes available in the defined subset of the plurality of event records as a single composite event of the defined process having the sequence of steps as a function of the accumulated data;
   defining a predetermined time interval;
   at the defined predetermined time interval, updating the defined subset by modifying the defined subset based on and in response to the progressively accumulated additional data wherein the subset is updated to include additional event records from the progressively accumulated additional data which meet the defined condition as the single composite event at the defined predetermined time interval;
   after said updating, evaluating only the updated defined subset against the defined condition without evaluating any of the plurality of event records associated with the process which are not part of the defined subset; and
   notifying the user when the evaluated subset indicates that the defined condition has occurred.

2. The method of claim 1 wherein defining a subset comprises defining the subset as a function of a current time, a last run time, and the defined condition, said current time specifying a time when the subset is currently defined, said last run time specifying a time when the subset is last defined.

3. The method of claim 2 wherein notifying comprises notifying the user when the data of the defined subset indicates the defined condition has occurred.

4. The method of claim 2 wherein the last run time comprises a function of the current time and the predetermined time interval and wherein event records previously processed are not processed with event records occurring during the predetermined time interval.

5. The method of claim 1 further comprising maintaining a subscription table including a plurality of users with corresponding defined conditions and wherein notifying comprises notifying each of the plurality of users when their corresponding defined condition as indicated in the subscription table has occurred.

6. The method of claim 2 wherein defining comprises pre-correlating data in the subset based on one or more of the following: the defined condition, the current time and the last run time.

7. A system for notifying a user of an occurrence of a defined condition, said system comprising:
   one or more processors configured to execute computer-executable instructions for defining a process including a plurality of event records associated therewith, each of the plurality of event records including a plurality of data fields having data relating to the process, each of the plurality of event records in the process being a part of a sequence of steps for achieving the process;
   wherein the one or more processors further execute computer-executable instructions embodied in at least the following:
      an event provider for defining a subset of the plurality of event records wherein the subset includes only event records which meet the defined condition, said condition being formulated as a query about process instances of the defined process, wherein each of the plurality of even records in the subset is also part of the sequence of steps for achieving the process, said event provider defining a predetermined time interval;
      wherein the event provider receives initial data for the plurality of data fields relating to the defined subset and, based on the received initial data, continuously accumulates additional data relating to the received initial data and relating to the defined process as the additional data becomes available in the defined subset of the plurality of event records as a single composite event of the defined process having the sequence of steps as a function of the accumulated data, said additional data not being stored in a long-term storage;
      wherein the event provider updates the data in the subset of the plurality of event records by modifying the data in the subset based on and in response to the accumulated data as the single event at the defined predetermined time interval; and
      a notification component for evaluating only the defined subset against the defined condition without evaluating any of the plurality of event records associated with the process which are not part of the defined subset and for further notifying the user when the evaluated subset indicates that the defined condition has occurred, wherein the event provider offloads the evaluation of the updated data in the subset to the notification component, and wherein work between the notification component and the event provider of receiving the data is separated.

8. The system of claim 7 wherein the event provider defines the subset as a function of a current time, a last run time, and the defined condition, said current time specifying a time when the subset is currently defined, said last run time specifying a time when the subset is last defined.

9. The system of claim 8 wherein the last run time comprises a function of the current time and the predetermined time interval and wherein event records previously processed are not processed with event records occurring during the predetermined time interval.

10. The system of claim 7 wherein the event provider pre-correlating data in the subset based on one or more of the following: the defined condition, the current time and the last run time.

11. The system of claim 7 further comprising a subscription table including a plurality of users with corresponding defined conditions and wherein the notification component notifies each of the plurality of users when their corresponding defined condition as indicated in the subscription table has occurred.

12. The system of claim 7 wherein the event provider pre-correlates the updated data with the subset of event records from the plurality of updated event records according to the defined condition and wherein the notifying component notifies the user of the occurrence of the event when the pre-correlated data of the subset of plurality of event records indicates that the defined condition is satisfied.

13. One or more computer storage media having computer-executable components for notifying a user of an occurrence of a defined condition, said components comprising:

an event provider for defining a process including a plurality of event records associated therewith, each of the plurality of event records including a plurality of data fields having data relating to the process, each of the plurality of event records in the process being a part of a sequence of steps for achieving the process, said event provider is further configured for pre-correlating data with a subset of the plurality of event records wherein the subset includes event records which meet the defined condition, said condition being formulated as a query about process instances of the defined process, each of the plurality of event records relating to each other and dependent on one another, wherein each of the plurality of even records in the subset is also part of the sequence of steps for achieving the process, said event provider defining a predetermined time interval;

wherein the event provider pre-correlates data by receiving initial data for the plurality of data fields relating to the defined subset of the plurality of event records, as the initial data becomes available and, based on the received initial data, progressively accumulating additional data relating to the received initial data and relating to the defined process as a single composite event of the defined process having the sequence of steps as a function of the accumulated data, wherein the additional data is not stored in a long-term storage;

wherein the event provider updates the defined subset by modifying the defined subset based on and in response to the accumulated data as the single event at the defined predetermined time interval; and a notification component for evaluating only the defined subset against the defined condition without evaluating any of the plurality of event records associated with the process which are not part of the defined subset and for further notifying the user when the evaluated subset indicates that the defined condition has occurred, wherein the notification component evaluates the defined subset as the updated data is available.

14. The computer storage media of claim 13 wherein the event provider defines the subset as a function of a current time, a last run time, and the defined condition, said current time specifying a time when the subset is currently defined, said last run time specifying a time when the subset is last defined.

15. The computer storage media 14 wherein the last run time comprises a function of the current time and the predetermined time interval and wherein event records previously processed are not processed with event records occurring during the predetermined time interval.

16. The computer storage media of claim 13 wherein the event provider pre-correlating data in the subset based on one or more of the following: the defined condition, the current time and the last run time.

17. The computer storage media of claim 13 wherein the notification component includes a subscription table including a plurality of users with corresponding defined conditions and wherein the notification component notifies each of the plurality of users when their corresponding defined condition as indicated in the subscription table has occurred.

* * * * *